United States Patent [19]

Goller et al.

[11] 4,175,055
[45] Nov. 20, 1979

[54] DRY MIX METHOD FOR MAKING AN ELECTROCHEMICAL CELL ELECTRODE

[75] Inventors: Glen J. Goller, West Springfield, Mass.; Vincent J. Petraglia, Vernon; Joseph R. Salonia, Middletown, both of Conn.

[73] Assignee: United Technologies Corporation, Hartford, Conn.

[21] Appl. No.: 920,037

[22] Filed: Jun. 28, 1978

[51] Int. Cl.² .................... H01M 4/04; H01M 4/96
[52] U.S. Cl. .................... 252/425.3; 252/182.1; 427/115; 427/122; 427/195; 427/201; 427/294; 429/42
[58] Field of Search .................... 252/425.3, 428, 430, 252/182.1; 429/42; 427/115, 122, 294, 195, 201

[56] References Cited

U.S. PATENT DOCUMENTS

| | | | |
|---|---|---|---|
| 3,573,991 | 4/1971 | Lenfant et al. | 252/182.1 |
| 3,829,327 | 8/1974 | Omori et al. | 429/218 |
| 3,857,737 | 12/1974 | Kemp et al. | 252/182.1 |
| 3,900,607 | 8/1975 | Rummel | 252/425.3 |
| 4,017,663 | 4/1977 | Breault | 429/42 |
| 4,044,193 | 8/1977 | Petrow et al. | 429/42 |
| 4,129,633 | 12/1978 | Biddick | 264/40.3 |

FOREIGN PATENT DOCUMENTS 1163479 9/1969 United Kingdom .................... 429/42

*Primary Examiner*—P. E. Konopka
*Attorney, Agent, or Firm*—Stephen E. Revis

[57] ABSTRACT

A method for making an electrochemical cell electrode involves depositing a layer of mechanically blended dry catalyzed carbon powder and dry hydrophobic polymer powder on the surface of a substrate by dispersing the mixture of powders as a cloud in a chamber over the substrate and pulling the powder onto the substrate by drawing a vacuum under the substrate. The method is particularly adapted to the high speed manufacture of electrodes.

9 Claims, 1 Drawing Figure

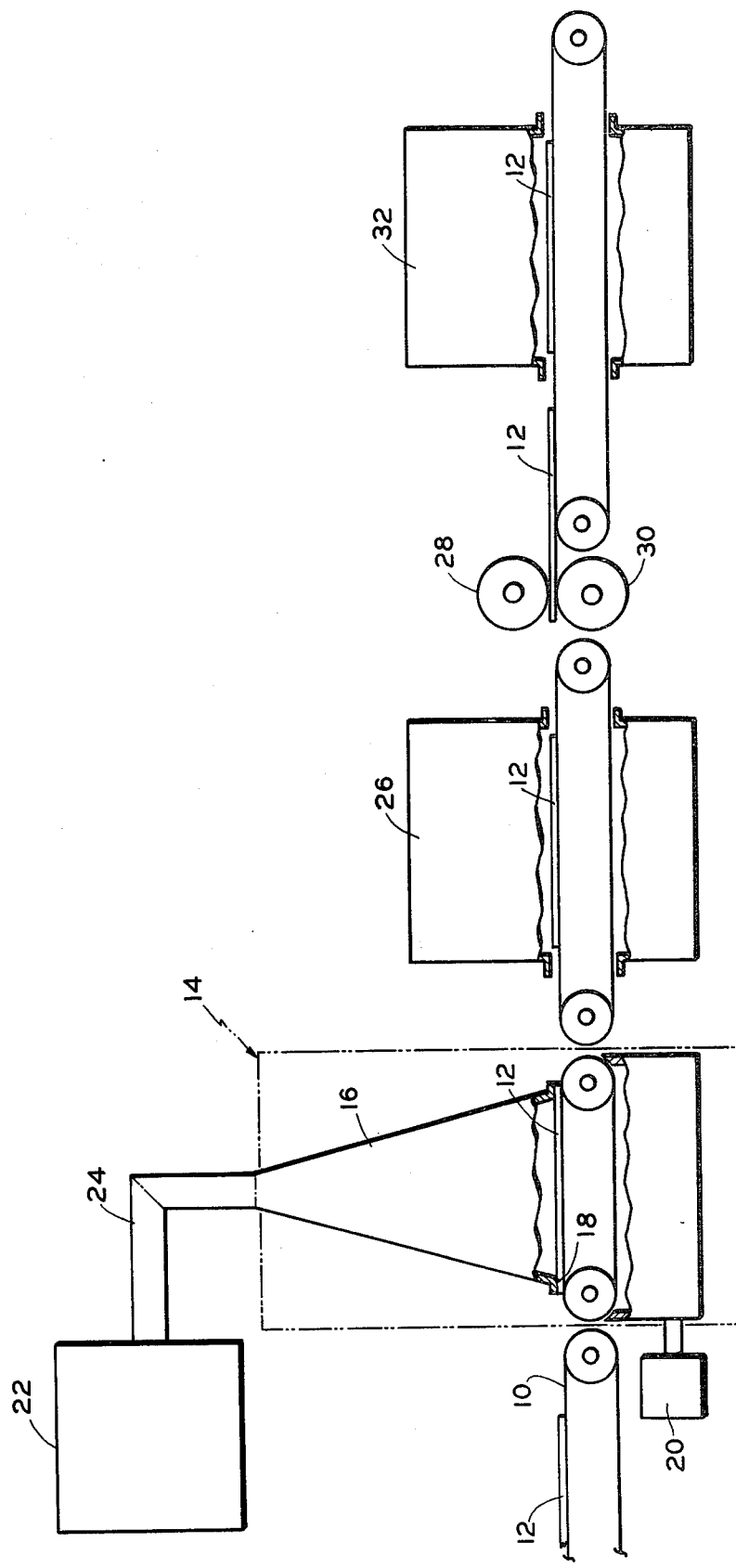

DRY MIX METHOD FOR MAKING AN ELECTROCHEMICAL CELL ELECTRODE

BACKGROUND OF THE INVENTION

1. Field of the Invention

This invention relates to electrochemical cell electrodes and, more particularly, a method for making said electrodes.

2. Description of the Prior Art

Electrodes for use in electrochemical cells such as fuel cells are well known in the art. Once common type of electrode is the gas diffusion electrode. A pair of gas diffusion electrodes are disposed on either side of a compartment containing a matrix which is soaked with electrolyte. A catalyst is disposed on the electrolyte facing surface of each electrode. Hydrogen is fed to the back side of one electrode while oxygen or air is fed to the back side of the other electrode. The gases enter the electrodes and react with the electrolyte in the presence of the catalyst.

Many types of gas diffusion electrodes are described in the literature. One type of gas diffusion electrode comprises a layer of polytetrafluoroethylene (PTFE) mixed with a catalyst supported on carbon particles (i.e., catalyzed carbon), said layer being disposed on the surface of a porous carbon substrate (e.g., carbon paper). The PTFE (or any other compatible hydrophobic polymer) prevents the electrolyte from filling up the electrode to such an extent that sufficient fuel or oxidant cannot reach the catalyst. A gas diffusion electrode of this type is described in column 5 of commonly owned U.S. Pat. No. 3,857,737 to Kemp et al.

Another type of gas diffusion electrode comprises a carbon paper substrate with a layer of uncatalyzed carbon mixed with PTFE applied to the surface thereof; unsupported catalyst is then applied to the carbon/PTFE layer. An electrode of this type is described in commonly owned U.S. Pat. No. 3,972,735 to Breault.

One technique for applying either the catalyzed carbon/PTFE layer or the uncatalyzed carbon/PTFE layer to a substrate is the direct filtration method. In that method carbon powder (catalyzed or uncatalyzed) and an aqueous PTFE dispersion are blended into an alcohol/water solution to form a co-suspension of carbon and PTFE therein. The suspension is caused to floc, such as by heating or adding a floccing agent. Floccing is the coalescence of the catalyzed or uncatalyzed carbon particles with the PTFE particles. A proper floc is one which achieves uniform size agglomerates of catalyzed or uncatalyzed carbon and PTFE particles and a homogeneous distribution or mix of the particles. After floccing, excess liquid is decanted and the floc is applied to the surface of a carbon paper substrate which acts as a filter. Liquids pass through the substrate and a layer of the desired solids mixture (i.e., the floc) remains on the surface of the substrate. The article is dried, compacted, and sintered. If the applied layer does not include catalyst, a separate catalyst application step would be required.

A related technique is the indirect filtration (or filter transfer) method wherein the layer of floc is applied to the substrate by first filtering it onto special filter paper instead of onto the carbon paper substrate. The layer is then transferred from the filter paper onto the carbon paper, dried, compacted, and sintered as in the direct filtration method.

Satisfactory electrodes have been made by both of the foregoing filtration methods; however, these techniques are slow, expensive and not suitable for production runs wherein hundreds and thousands of electrodes must be made in a relatively short period of time at minimal cost.

It has been our experience that different methods for applying a carbon/PTFE layer usually result in an electrode with different performance characteristics. One reason for this is that the arrangement of carbon and PTFE particles relative to each other in the layer, the precise nature of the particles themselves (such as their surface chemistry), and the uniformity of the layer and imperfections in the layer often vary from method to method. For example, a layer formed by first applying carbon powder to the substrate and then infiltrating the carbon powder with PTFE yields a completely different structure than that formed by preparing a co-suspension of carbon and PTFE, floccing the co-suspension, and applying the wet floc to the substrate.

Thus, it is not a small task converting from an expensive, slow, electrode fabrication method which is known to produce highly satisfactory electrodes, to a faster, more economical production type fabrication process.

Two patents which relate to methods for applying materials to fuel cell electrode substrates and which, therefore, may be of general interest to the subject matter of the present application, are U.S. Pat. No. 3,573,991 Lenfant et al and U.S. Pat. No. 3,591,421 Schultze et al. The former is directed to the use of electrostatic projection for the purpose of forming a variety of layers which constitute an electrode. Electrostatic projection involves imposing a charge on a support, imposing an opposite charge on the particles of a powdered material which is to be applied to the support as a layer, and fluidizing the charged particles of powder above the oppositely charged support. The powder is attracted to the support and coats the support to a thickness which is dependent upon a number of parameters.

Experiments have been conducted using electrostatic projection to apply a dry precatalyzed carbon/PTFE floc to a carbon paper substrate but were unsuccessful due to the inability to apply a proper charge distribution to the floc.

Schultze et al, in column 6 at lines 19–25 indicates that a hydrophobic polymer powder can be distributed within the pores of a porous substrate by moving the substrate through a chamber in which fine particles of the hydrophobic polymer powder are uniformly whirled up and thrown against an exposed face of the substrate while applying an intermittent vacuum to the opposite face. The express object of Schultze et al is to obtain a specified density distribution of hydrophobic polymer within the pores of the substrate. Later heating of the substrate fixes the polymer particles to the walls of the pores as discussed in column 5 at lines 44–53. As will become clear from the description of applicants' invention as set forth hereinbelow, applicants' method is not for the purpose of wetproofing the substrate nor does it introduce a hydrophobic polymer into the pores thereof. Rather, it is a method for applying a layer of carbon/hydrophobic polymer powder on the surface of a substrate which is usually (but not necessarily) already wetproofed.

With regard to any of the prior art methods for applying a carbon/hydrophobic polymer layer to an electrode substrate, those which have been most successful involve the formation of a floc which also includes removal of excess liquids from the floc and a drying step at some stage during the electrode fabrication process. Significant economic savings may be realized if some of these steps could be eliminated. As will become clear from the following description, all of these steps are eliminated by the present invention.

SUMMARY OF THE INVENTION

An object of the present invention is an improved method for manufacturing electrochemical cell electrodes.

Another object of the present invention is a method for making reproducible electrodes on a continuous basis.

A more specific object of the present invention is a method for applying a carbon/hydrophobic polymer layer on the surface of an electrode substrate.

Yet another object of the present invention is a method for manufacturing an electrode which eliminates the floccing step normally required as part of the process for applying a satisfactory carbon/hydrophobic polymer layer to the surface of an electrode substrate.

Accordingly, the present method for making an electrode comprises applying a substantially uniform layer of a mechanically blended mixture of dry carbon powder and dry hydrophobic polymer powder on the surface of an electrode substrate by dispersing the mixture as a cloud in a chamber over the substrate and pulling the powder onto the substrate by drawing a vacuum under the substrate; compacting the applied layer; and sintering the compacted article.

The term "sintering" as used above and hereinafter in the specification and claims means heating to a temperature sufficiently high and for a sufficient length of time to result in a bonding of the carbon particles and polymer particles to each other and to the substrate and to provide partial hydrophobicity to the carbon/polymer layer. Temperatures should not be so high as to cause the polymer to degrade.

"Carbon," as that word is used in referring to the carbon in the carbon/hydrophobic polymer layer includes but is not limited to acetylene black, carbon black, graphite, and the like. Unless otherwise stated it also encompasses precatalyzed as well as uncatalyzed carbon, wherein a catalyst such as platinum is disposed on the surface of the carbon particles such that the carbon is a support for the catalyst. The use of precatalyzed carbon is preferred because a separate catalyzing step after the carbon/hydrophobic polymer layer is applied to the substrate is thereby eliminated. Platinum is the preferred catalyst. Since the catalyzed carbon is not a part of the present invention per se, it may be made by any method well known in the art, such as the methods described in commonly owned U.S. Pat. No. 3,857,737 to Kemp et al or in U.S. Pat. No. 4,044,193 to Petrow et al.

The hydrophobic polymer may be any hydrophobic polymer compatible with the electrolyte to be used in the electrochemical cell. Polytetrafluoroethylene is the presently preferred polymer, as is well known in the art; but, fluorinated ethylene propylene (FEP) and other compatible hydrophobic fluorocarbon polymers and combinations thereof may also be suitable for some applications. Fluorocarbon polymers with molecular weights of $10^6$ or greater and having as small a particle size as possible are most preferred.

In commonly owned U.S. patent application Ser. No. 920,036 titled "Dry Floc Method For Making An Electrochemical Cell Electrode" by G. Goller and J. Salonia and filed on even date herewith a method for making an electrode is described which requires forming a co-suspension of carbon particles and hydrophobic polymer particles, floccing these particles, filtering the floc to remove excess water, drying the floc, forming the dried floc into a fine powder, and applying the floc as a uniform layer to the surface of a substrate by dispersing the floc as a cloud of powder in a chamber over the substrate and pulling the powdered floc onto the substrate by drawing a vacuum under the substrate. The present method eliminates all of the steps involved with forming the floc and drying the floc. In the method of the present invention a powder is formed by mechanically mixing dry carbon powder and dry hydrophobic polymer powder to form a uniformly dispersed mixture of the two powders. This powder is applied as a uniform layer on the surface of a substrate by dispersing it as a cloud in a chamber over the substrate and pulling the powdered floc onto the substrate by drawing a vacuum under the substrate.

The economic advantages over the prior art techniques and even over the method described in the aforementioned co-pending Goller et al application are apparent in view of the simplified manner in which the carbon/hydrophobic polymer powder is fabricated. Additionally, the speed and reproducibility of the present method is also better than prior art methods; and the electrodes may be reliably manufactured by persons unskilled in any form of chemical technology.

In the method of hereinabove described copending U.S. application Ser. No. 920,036 burning of the electrode during final sintering was often a problem which had to be dealt with, such as by adding a small amount of phosphoric acid to the dry floc powder or by sintering in a vacuum or inert atmosphere. With the method of the present invention burning of the electrode during sintering has not been a problem.

The method of the present invention is equally suited to using precatalyzed carbon powder as well as uncatalyzed carbon powder. The use of precatalyzed carbon in the preparation of the electrodes eliminates the necessity of a catalyzation step after the powder has been applied to the substrate. This feature gives the present method advantages over the screen printing method described in commonly owned U.S. application Ser. No. 920,038 titled "Screen Printing Method for Making An Electrochemical Cell Electrode" by G. Goller, V. Petraglia, and G. Dews filed on even date herewith.

The foregoing and other objects, features, and advantages of the present invention will become more apparent in the light of the following detailed description of preferred embodiments thereof as illustrated in the accompanying drawing.

BRIEF DESCRIPTION OF THE DRAWING

The sole FIGURE is a schematic illustration of an automated system for applying a carbon/hydrophobic polymer layer to a porous electrode substrate in accordance with a preferred embodiment of the present invention.

DESCRIPTION OF THE PREFERRED EMBODIMENT

Referring to FIG. 1, a conveyor belt 10 feeds an electrode substrate 12 which is to be coated into cloud chamber apparatus generally represented by the numeral 14. The substrate 12 is precisely positioned under a pyramid-like chamber 16. Suitable mechanical means, not shown, serve to move the substrate 12 relative to the chamber 16 such that the bottom edge 18 of the chamber 16 fits tightly against the outside edge of the substrate. A turbine 20 provides a controlled vacuum pressure under the substrate 12. In our operation we have used a vacuum of from 4–8 inches of water but higher pressures may also be used. The best vacuum pressure will depend upon the porosity of the substrate and other factors, but can be readily determined with a few trial runs.

Apparatus represented by the box 22 automatically measures a predetermined amount of the mechanically blended carbon and hydrophobic polymer powder hereinbelow more fully described. As soon as the turbine 20 is turned on, the premeasured powder is drawn into the chamber 16 via the conduit 24 and is quickly drawn to the exposed surface of the porous substrate 12. Since the powder blocks the pores of the substrate, the flow of air (with powder entrained therein) toward an area diminishes as the area is covered with powder. Areas with less powder will therefore receive more of the remaining powder. A few percent of the powder will probably pass through the substrate. The net result is a very uniform thickness of powder over the entire surface of the substrate with virtually no powder within the pores of the substrate.

In this preferred embodiment the substrate is held in position with the vacuum on for a long enough time to ensure that essentially all the measured amount of powder admitted into the chamber 16 has been deposited on the substrate or has passed therethrough. Since the amount which passes through is essentially constant for a particular type of substrate, the proper amount of powder to be introduced into the cloud chamber to achieve any desired catalyst loading may be precisely determined with a few trial runs.

An alternate method for applying the powder according to the present invention is to introduce a large excess of powder into the chamber over the substrate and to keep the powder whirling in a cloud over the substrate (e.g., with air jets) while simultaneously applying the vacuum. The substrate is removed from the chamber after a predetermined amount of time which is calculated to yield the appropriate buildup of powder on the substrate. We have used this technique successfully, but prefer the former technique because it is more readily adaptable to high speed operation, it is easier to control the amount of powder applied to the substrate, and the apparatus is less complicated because a device for continuously "whirling" the powder over the substrate is not required.

After application of the appropriate amount of powder to the substrate, the substrate is automatically moved through subsequent stages of the electrode fabrication process, which, in this preferred embodiment, comprise a compacting step at rollers 28, 30 and a sintering step in oven 32. These latter steps are well known in the art.

If the electrode made by the method of the present invention is intended for use in a phosphoric acid fuel cell a preferred substrate is a resin bonded, wetproofed, graphitized fibrous carbon paper having a high open porosity; however, any porous substrate compatible with the fuel cell environment is likely to be satisfactory. The cloud chamber process for applying the powder works equally well using substrates with porosities as low as 60% and as high as 90%. Generally speaking, and notwithstanding the method of the present invention, substrates with higher porosities have been found to make better electrodes. For this reason we most prefer substrates with porosities of at least 80%.

Carbon paper itself may be made, for example, by carbonizing a fiber such as nylon or rayon by heating at about 1300°–1500° F. The carbonized fibers are then cut to the desired length and made into paper by any one of the well known paper making processes. The paper may then be graphitized by further heating. It may then be wetproofed by impregnating it with from 2–10 mg/cm$^2$ PTFE such as by dipping the graphitized carbon paper in a solution of TFE-30 containing 26% PTFE solids. TFE-30 is manufactured by Dupont and is an aqueous dispersion (including a surfactant) of PTFE particles of about 0.2 micron size. The impregnated carbon paper is dried at 160±10° F. for 25 minutes. It is then placed in a bath of isopropanol to leach out most of the surfactant. The leaching step is optional since the surfactant may be removed during later steps in the electrode manufacturing process. Finally, the substrate is heated to 640° F. and held at that temperature for about 20 minutes. Methods for making carbon paper substrates are also described in commonly owned U.S. Pat. No. 3,972,735 and in U.S. Pat. No. 3,829,327. Carbon fiber paper can also be purchased from various manufacturers such as Union Carbide Co., Stackpole Carbon Co., and Kreha Corp.

As has been heretofore discussed, electrode performance is at least partially dependent upon the arrangement of carbon and PTFE particles relative to each other in the layer applied to the substrate. For example, it is undesirable to have polymer rich areas within the layer just as it is undesirable to have carbon or catalyst rich areas. In the process of hereinbefore mentioned copending patent application Ser. No. 920,036, this arrangement is determined by the floc process. That is not the case in the present invention wherein the powder used in a mechanical blend of carbon particles and polymer particles. In the present invention we have found that the size of the particles used is important in obtaining the proper arrangement as well as distribution of carbon and polymer within the catalyst layer and in obtaining a very uniform and substantially defect free layer. Generally, the smaller the particle size used in the process of the present invention, the better the electrode. Smaller particles tend to form a more uniform cloud as they are being drawn onto the substrate by the vacuum. Furthermore, the smaller the particles, the smaller the voids between the particles in the applied layer, which improves the uniformity of the layer. If particles are too large or too heavy they fall to the substrate without proper dispersal which may result in a less uniform distribution of particles on the surface of the substrate. In this regard it is preferred that the size of the carbon particles and polymer particles be as close to the same order of magnitude as possible.

In Example II below it will be noted that the maximum particle size was as large as 75 microns. It is believed that for most applications it would be desirable that the particle size be no larger than ten microns. Larger particle sizes may produce electrodes which initially perform as well as prior art electrodes, but their long term performance characteristics may not be as good. However, for short term applications larger particles may be used and the economic advantages of the present invention may still be realized. For best overall electrode performance, including excellent endurance, we suggest using a powder having particles with a mean size in the one micron range or smaller and having no particles greater than about five microns.

EXAMPLE I

This example is the preferred method for practicing the present invention. Apparatus similar to that shown in FIG. 1 is used. The dry powder mixture is a combination of 45% by weight PTFE and 55% by weight catalyzed carbon. The catalyzed carbon comprises 10% by weight platinum and 90% by weight carbon; its particle size, as purchased, is on the order of about one micron or less. The PTFE is purchased as TFE-6 manufactured by Dupont; it is a dry powder having a molecular weight of about $1 \times 10^6$ and a particle size of over 100 microns. The TFE-6 particles are preliminarily reduced in size in a Bantam Mikro-Pulverizer manufactured by Pulverizing Machinery Division of Mikropul, Summit, N.J. and then thoroughly blended with the precatalyzed carbon until a uniform mixture is obtained. The preliminary size reduction of the TFE-6 is optional and may be omitted. The mixture is then put into a Jet-O-Mizer manufactured by Fluid Energy Processing and Equipment Co. of Hatfield, Pa., which reduces the powder to an estimated mean particle size of about one micron or less and further improves the uniformity of the dispersion of the two powders. A more detailed discussion pertaining to reducing the particle size of the powder used in the present invention may be found in commonly owned, copending U.S. patent application Ser. No. 920,035 titled "Catalytic Material For Fuel Cell Electrodes" by R. Singer and filed on even date herewith.

A 2300 cm$^2$ wetproofed carbon paper substrate having an open porosity of from 70–90% and a mean pore size of between 40 and 50 microns is positioned at the bottom of the chamber 16. A vacuum of from 4 to 8 inches of water is drawn under the substrate and 22.28 grams of the above-described powder is released into the chamber. Assuming that about 10% of the powder will pass through the substrate, this amount of powder will yield a platinum catalyst loading of about 0.50 mg/cm$^2$. The precise amount of powder needed to yield a 0.50 mg/cm$^2$ loading is readily determined by making several trial electrodes.

The substrate with the applied carbon/PTFE layer is covered with a protective sheet of poster board lightly coated with carbon and is compacted between a pair of rollers. The amount of pressure used is selected to obtain maximum compaction without damaging the substrate. We use pressures from 15–18 pounds per linear inch. The protective paper is merely for the purpose of preventing any material from sticking to the rollers and may be omitted if this does not appear to be a problem. The compacted article is then heated in an oven at a sufficiently high temperature and for a sufficiently long period of time to sinter the PTFE. Sintering temperatures may be anywhere from 600° F. to 700° F. The best temperature for any particular electrode may readily be determined by trial and error. We prefer to use sintering temperatures between 620° F. and 660° F. The sintering of electrodes is common practice in the art and is not considered to add any novelty to the process of the present invention.

Electrodes made by the method of this example have initial performance characteristics which are comparable to some of the best electrodes made by more expensive and slower prior art methods. Endurance, to the extent that it has been tested as of the filing date of this application is also good.

EXAMPLE II

In this example the dry powder mixture is a combination of 22.5% by weight PTFE, 22.5% fluorocarbon polymer, and 55% catalyzed carbon. The catalyzed carbon is the same as that used in Example I. The PTFE is TFE-6, the same high molecular weight polymer used in Example I. The fluorocarbon polymer is DLX-6000 which is manufactured by Dupont; it is a dry powder having a submicron particle size and a low molecular weight of less than $10^5$. This combination of dry powders was chosen in an effort to obtain the benefits afforded by small particle size (DLX-6000) and the benefits afforded by high molecular weight (TFE-6).

All of the foregoing ingredients were mixed in a Waring Blender at high speeds for one minute for each thirty grams of mixture which reduced the maximum particle size to 50–75 microns. These large particles are TFE-6 particles, but they only make up a small part of the total mixture. The mean particle size is very much smaller than these larger particles. The blended powder was then applied to a substrate (without further reduction to particle size), compacted, and sintered, as described with regard to Example I.

These electrodes were not as stable and did not perform as well as electrodes made using the powder described in Example I due to the low molecular weight of DLX-6000 and the large particle size of the TFE-6. Initial performance was, however, quite good. In any event, these electrodes are very inexpensive to make as compared to electrodes made by prior art techniques, and in some short term fuel cell applications this initial performance may more than compensate for reduced stability.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of our invention, that which we claim as new and desire to secure by Letters Patent of the United States is:

1. A method for making an electrochemical cell electrode comprising the steps of:
    blending together, in dry form, dry carbon particles and dry hydrophobic polymer particles to form a dry mixture;
    applying a uniform layer of the dry mixture on the surface of a porous electrode substrate with virtually none of the mixture within the pores of the substrate by dispersing the mixture as a cloud of particles in a chamber over said surface of the substrate and pulling the carbon and polymer particles onto said surface by drawing a vacuum under the substrate;
    compacting the applied layer; and
    sintering the compacted layer.

2. The method according to claim 1 wherein the hydrophobic polymer is PTFE.

3. The method according to claim 2 wherein the PTFE in the dry mixture has a molecular weight of at least $10^6$ and, prior to its being applied to the substrate the dry mixture has a maximum particle size of less than about ten microns.

4. The method according to claim 2 wherein the carbon particles in the dry mixture are precatalyzed.

5. The method according to claim 2 wherein the carbon particles in the dry mixture are precatalyzed with platinum.

6. The method according to claim 1 wherein the hydrophobic polymer in the dry mixture has a molecular weight of at least $10^6$ and a mean particle size, prior to application to the substrate, of one micron or less with no particles greater than about five microns.

7. The method according to claim 3 wherein the electrode substrate is graphitized carbon paper made from carbon fibers and has an open porosity of at least 80%.

8. The method according to claim 7 wherein the dry mixture has a mean particle size of one micron or less.

9. The method according to claim 7 wherein the carbon particles in the dry mixture are precatalyzed with platinum.

* * * * *